Aug. 9, 1927.
A. R. LOCKE
1,638,774
SELECTIVE CIRCUIT SYSTEM AND REMOTE CONTROL
Filed Sept. 1, 1920
5 Sheets-Sheet 1
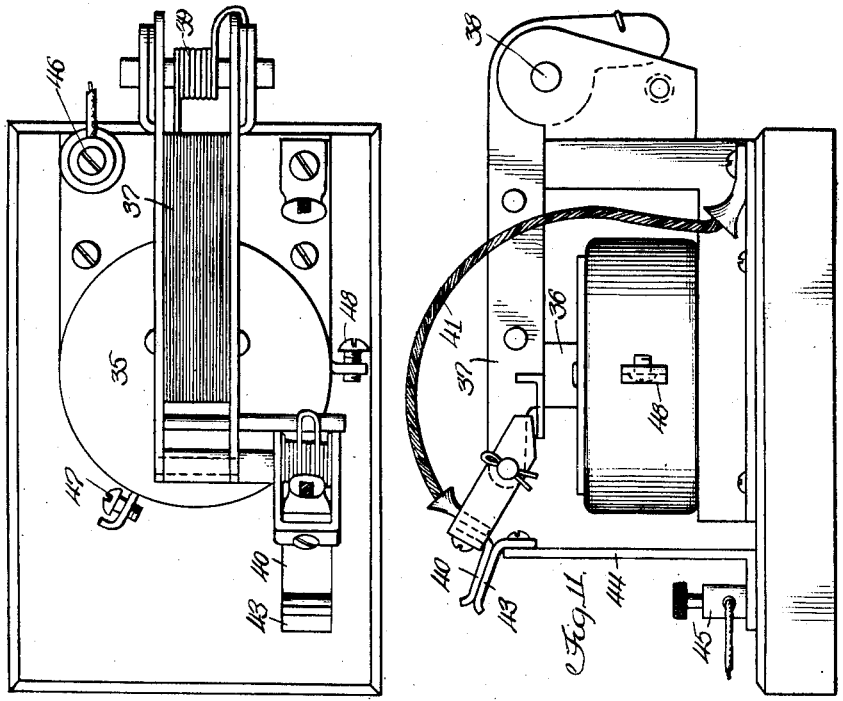
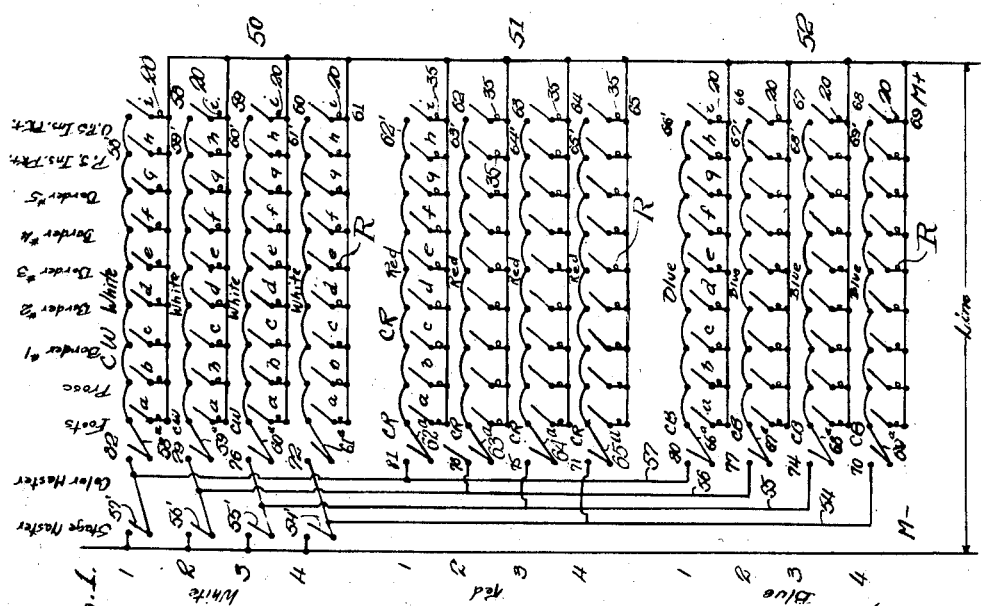

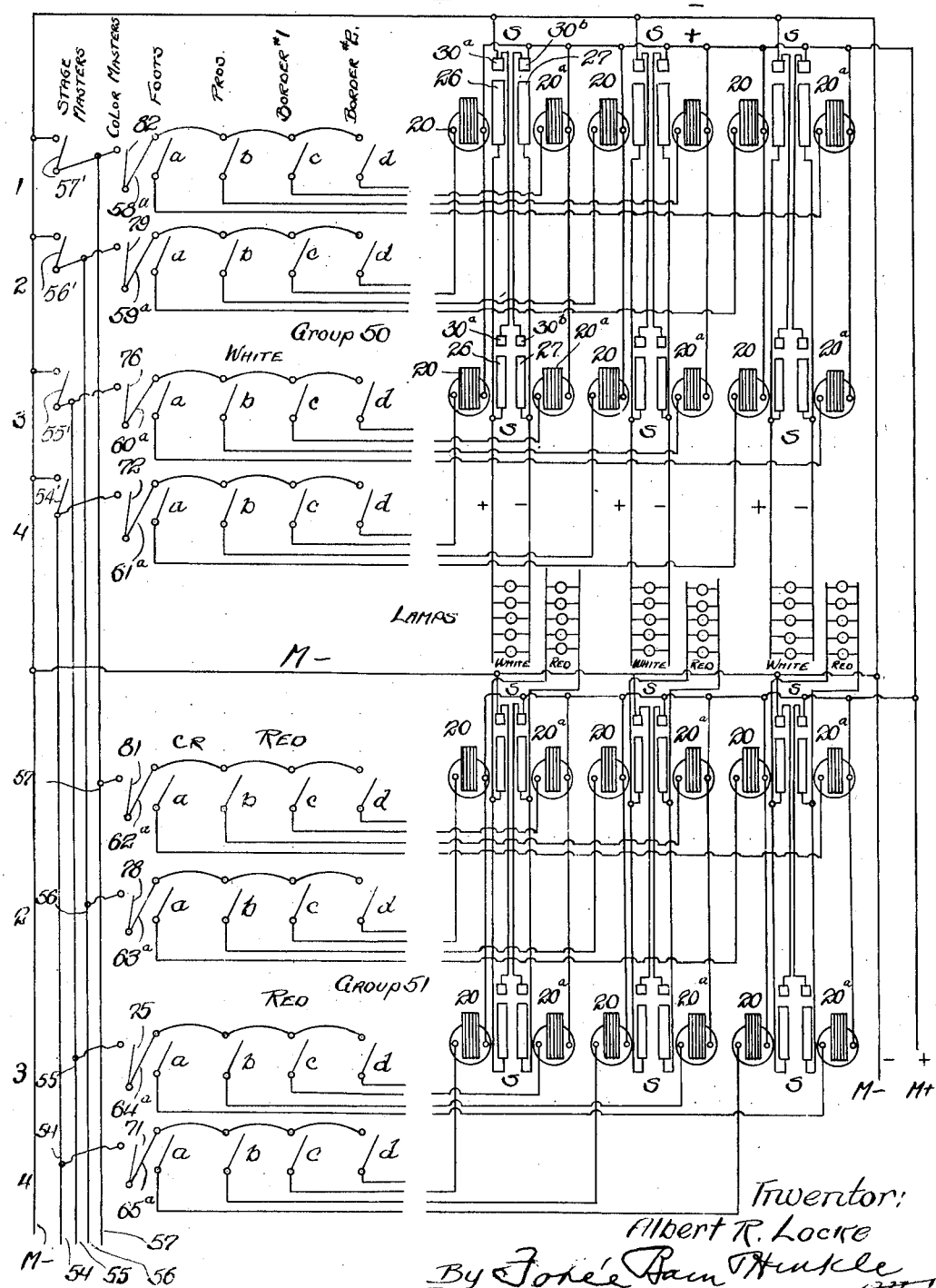

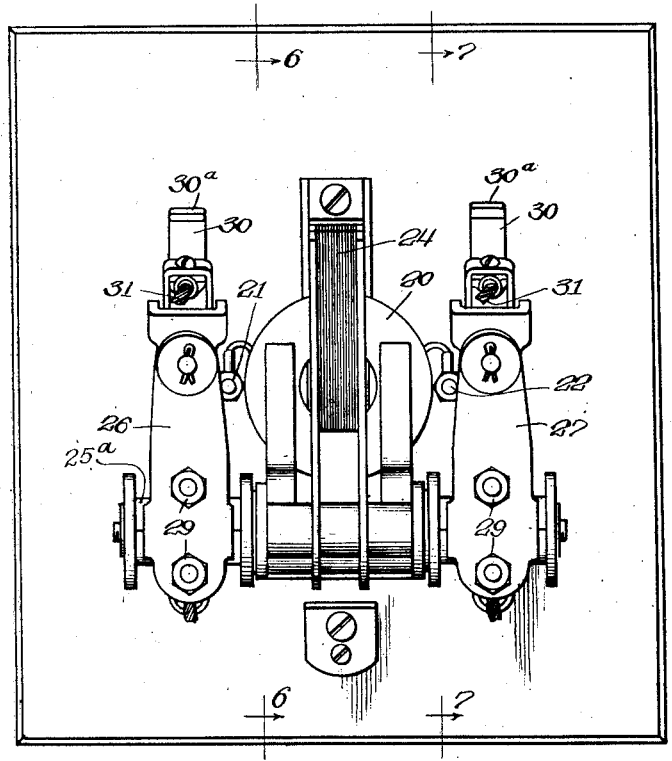
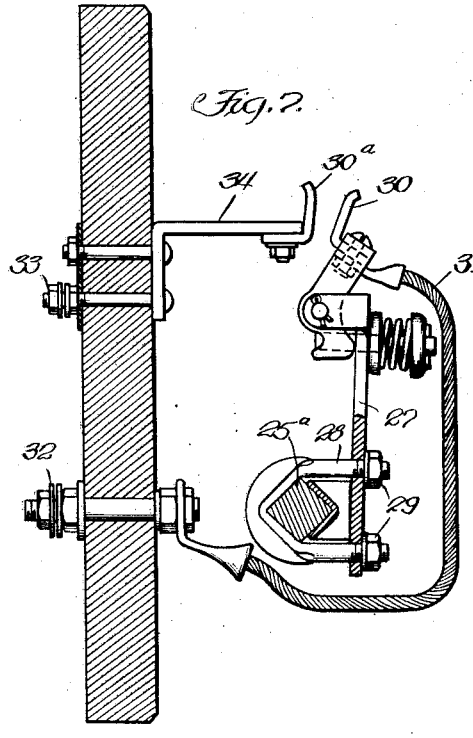
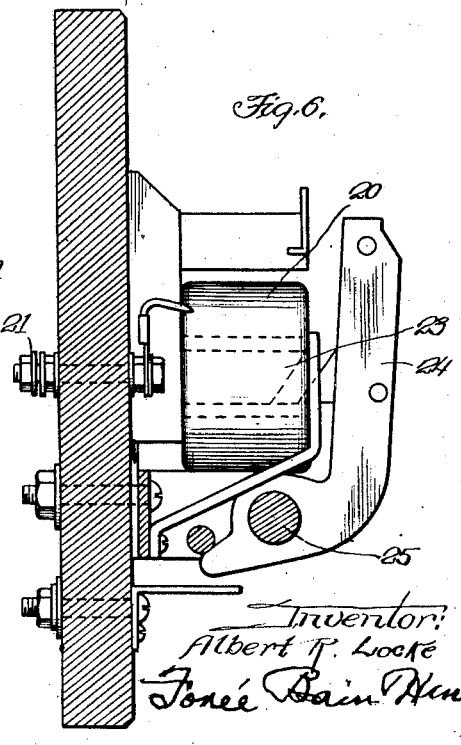

Aug. 9, 1927.

A. R. LOCKE 1,638,774

SELECTIVE CIRCUIT SYSTEM AND REMOTE CONTROL
Filed Sept. 1, 1920

Inventor:
Albert R. Locke
By Foree Bain Hinkle
Attys.

Patented Aug. 9, 1927.

1,638,774

UNITED STATES PATENT OFFICE.

ALBERT R. LOCKE, OF CHICAGO, ILLINOIS.

SELECTIVE CIRCUIT SYSTEM AND REMOTE CONTROL.

Application filed September 1, 1920. Serial No. 407,386. REISSUED

This invention relates to a selective circuit system and remote control of visual scenic effects.

An object of the invention is to provide a system by which a plurality of combinations of lights, or groups of lights for a scene, may be "set-up" in independent circuits, to be subsequently energized and which are non-interfering under any condition of operation and which may be selectively energized in any desired order.

Another object is to provide a system, as described in which the position of the switches, of a group of switches may be used to visually indicate the character of "set-up" instead of employing pilot lamps for the purpose.

Another object is to control each group of closed switches, by which the set-ups are made to control the circuits formed by a selective number thereof, in the specific groups, by use of a master switch and color switch.

Another object is to provide a system in which a full complement of scenes for an entire show, or play may be set-up at any time prior to the beginning of the show, and switched in and out in any order in which they may be required, and which set-ups may remain on the pilot board and used from time to time without change, for any desired period of time. The set-ups being made ready before they are required, no time is lost in shifting from one scene of illumination to another, at the time when variations in effects are needed.

Heretofore, remotely controlled systems of distribution of this character, commonly in use are confined to necessity of disconnecting one set-up, or order of circuits, before another set-up, or order of circuits, can be made. The present invention permits the possibility of setting up a number of circuits by the use of a series of independent sub-switches, each group of switches producing a different lighting effect, and each group producing an independently controlled scene, with a convenient means for shifting from one group to the other, in any order, by means of a color switch for each group and a master switch for each alike sub-group of each major group. In the accompanying illustration, as many as twelve set-ups can be made in advance before the beginning of a show. In this instance a three color and four set-up board is schematically illustrated.

In order that my system of remote control and electrical distribution may clearly be understood I have illustrated herein and will briefly describe several well known types of switches and relays but the invention herein is not specifically concerned with the particular details of their construction. They are merely shown as means to an end, for the purpose of rendering the following description more readily understood.

In the drawings:—

Figure 1 shows a schematic arrangement of circuits and the controlling pilot switches arranged in groups and sub-groups, and while the contactor switches are shown adjacent the pilot switches, for clearness of disclosure, they are in practice located on a board remote from the pilot switches, as more clearly shown in Fig. 1ᴀ.

Fig. 1ᴀ shows the arrangement of circuits, shown generally in Fig. 1, and in which two groups of switches and lamps are connected and in which two coil contactors are diagrammatically shown.

Figure 2 shows a fragmentary schematic arrangement of circuits of the pilot board and also an arrangement of circuits and the instruments of a switch board, which in a physical embodiment is located at a point remote from the pilot board, in which two circuits of the pilot board control directly one contactor of a series of contactors, or automatic light switches, for opening and closing a circuit containing electric lights.

Fig. 5 shows a plan view of a light switch or a contactor having one coil for controlling both legs of a lighting circuit.

Fig. 6 is a section taken on line 6—6 of Fig. 5.

Fig. 7 is a section taken on line 7—7 of Fig. 5.

Figure 10 is a plan view of a conventional relay, and,

Figure 11 is a side elevation of the relay.

In all the views the same reference characters are employed to indicate similar parts.

It may be well to first describe in general terms a contactor or circuit closing switch, and the relays illustrated before taking up a description of the circuits in which these instruments as an agency may be employed for carrying the invention into effect.

Figure 8:
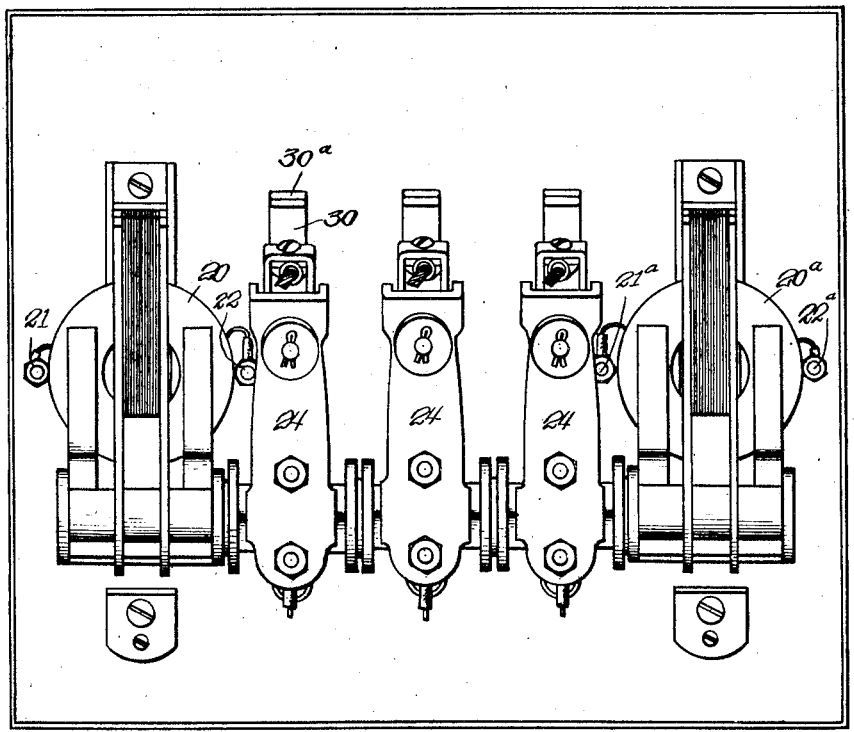
Fig. 8 shows a contactor having two coils, either of which, when energized, will operate the contactor for closing three legs of the lighting circuit.

In Figures 5 and 6 a central coil 20 is provided with terminals 21 and 22 to which relatively small wires from the pilot board may be connected, for the purpose of energizing the coil. The coil is provided with a relatively stationary core 23, and a movable circuit closing armature 24, which is pivoted, as at 25 to a shaft, which extends on either side of the pivotal point, as at 25ª, Figure 7. The contacting arms, 26 and 27, are connected to the shaft 25ª by means of yoke pieces 28, held in place by the nuts 29. Each of the arms carries a contact member 30, connected by a flexible cable 31 to a terminal 32 of the device. When the coil 23 is energized and the armature 24 attracted the contacts 30 and 30ª are closed and, therefore, circuit will be completed from the terminal 32 thru the cable 31, contacts 30 and 30ª, and through the standards 34 to the binding post 33, or the other terminal of the contactor or switch, and lamps connected thereto are lighted. The contactor, shown in Figure 8, is provided with two coils 20 and 20ª. When either of these coils is energized the arms 24, of which there are three, close their respective circuits as described, which may be three legs of a three wire system.

Figure 9:
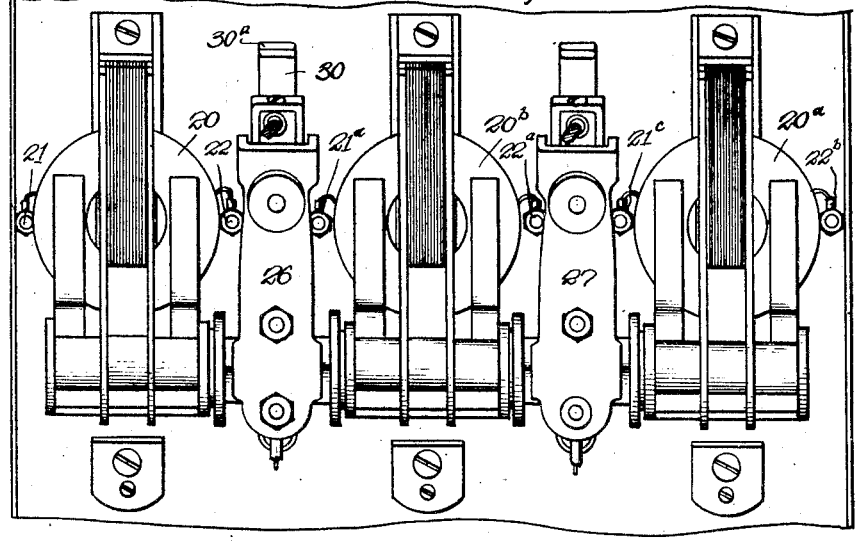
Figure 9 shows a similar contactor with three coils, any one of which coils will operate the switch for closing two legs of a circuit.

Figures 9 shows a similar contactor, or switch, having three coils 20, 20ª and 20ᵇ. Any one of these coils when properly energized, will cause the arms 26 and 27 to move downwardly and complete their respective circuits as heretofore described.

Figures 10 and 11 are plan and elevational views, respectively, of a relay, which may be employed intermediate the switches of the pilot board and the contactors which they control.

The relay shown in Figures 10 and 11 is provided with a magnet coil 35 which is directly connected to wires leading from the pilot switches, as by the terminals 47 and 48. When a pilot switch is closed through a suitable source of current supply, the relay coil 35 will be energized and the armature 37 thereof will be attracted to the core 36, thereby completing the circuit between the contact members 40 and 43. The latter member is mounted upon a standard 44 which is connected to the terminal 45 of the relay. The binding posts 45 and 46 are connected in such manner as to control the circuit through the coil 20 of the contactor, or light controlling switch. The armature 37 of the relay is pivoted as at 39 and is provided with a retractile spring 39, which moves the armature when the coil 35 is de-energized.

In the diagram Figure 1, showing the pilot board, there are three major groups of switches for as many different colored lights, groups 50, 51 and 52 for controlling the white lights, the red lights, and the blue lights, respectively. These groups may be extended to include a larger number of major groups for controlling lights of other colors, or lights or devices of other description or character.

Each of the major groups contains a plurality of sub-groups which I have numbered 1, 2, 3 and 4 respectively. There may be more or less. Each of the switches of the subgroups I have indicated by the reference characters a to i inclusive. The current supply mains, I have indicated by the reference characters M+ and M—, respectively. Between the main M+ and the series of major groups of switches there extends vertically a series of master switch mains, which I have indicated by the reference characters 54, 55, 56 and 57, there being one of these mains for as many sub-groups 1, 2, 3, 4 as are contained in one of the major groups 50, 51, 52. Like sub-group switches 58ª and 69ª of each major group are connected to a given master switch main 54 to 57. The first vertical line of switches a of all the groups, controls the white, red and blue foot lights; the second vertical line of switches b in the major groups control the same character of lights in the proscenium; the third vertical line of switches c controls border lights No. 1; the fourth d the border lights number 2, the fifth e border lights number 3, and so on.

I have indicated the lamp lighting switches or contactors by the reference character S and the relays, which, in some instances, may be used as intermediaries for controlling the contacting switches, by the reference character R. In Fig. 1 there is shown branch wires 58 to 69 inclusive from the main M+ connected through the respective relays R to the switches of the respective sub-groups, in parallel.

Figure 2:
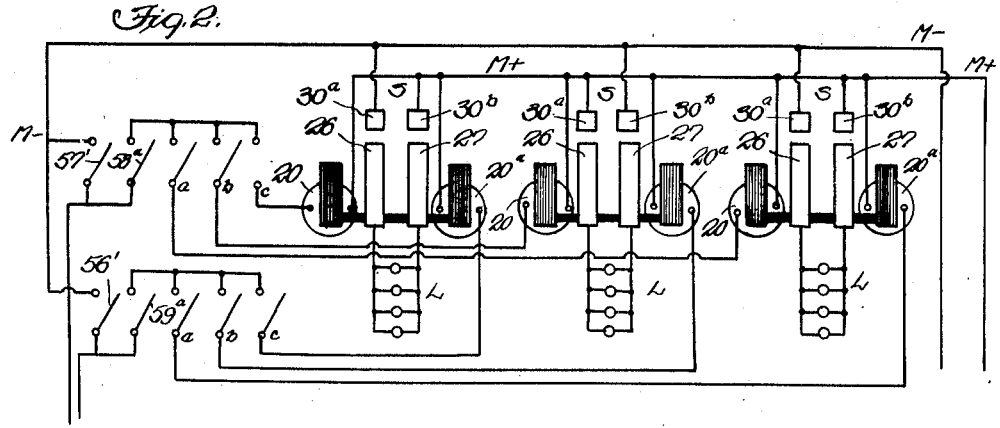
Figure 3:
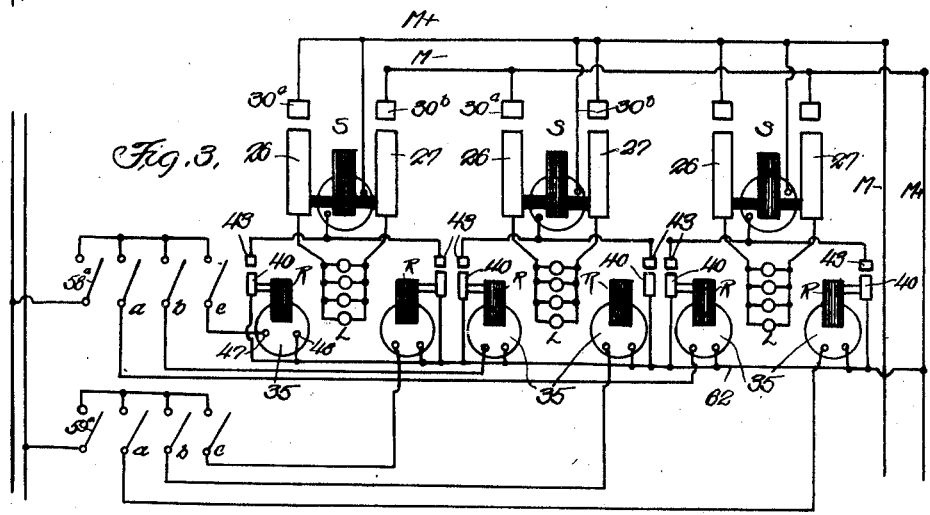
Fig. 3 shows a contactor common to two or more circuits of the pilot board with intervening relays, there being one relay for each circuit.
Figure 4:
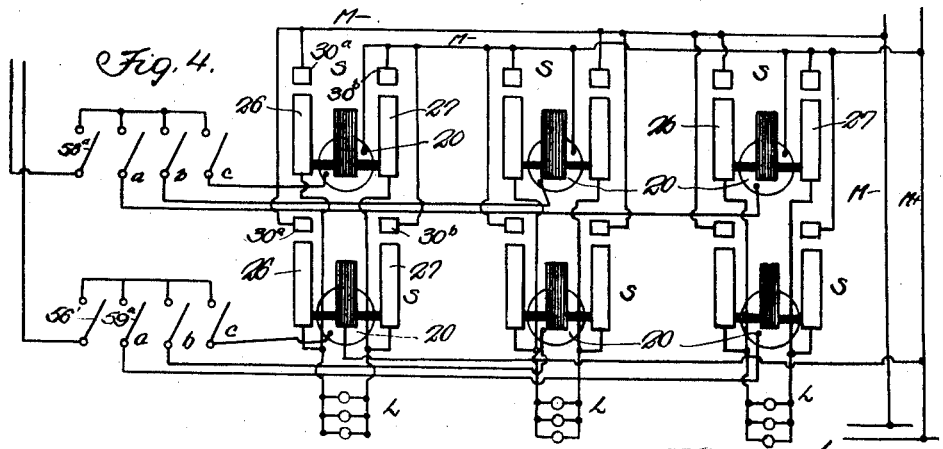
Fig. 4 is a modification of Fig. 2, showing a contactor or switch individual to each circuit of the pilot board in which two switches control the same set of lights.

In Fig. 3 the relays R are shown located near the contactors or switches S, where they may be located, though they may be located on or nearer the pilot board. In Fig. 3 one terminal 48 of the relay is shown connected direct to the branch wire 62, which is a branch of the main M+, as shown in the second major group 51 in Fig. 1. The other terminal of each of the relays is connected to one terminal of one of the switches $a$ to $i$, inclusive, in consecutive order.

The color switches are indicated by C W for the white lights; C R for the red lights and C B for the blue lights and there is a color switch for each sub-group of switches on the pilot board. The switches $a$ to $i$, inclusive, have like contacts connected to a common wire designated 58' to 69' inclusive and respectively. These wires are connected to the respective color switch, as by wires 58$^a$ to 69$^a$ respectively. The master switch mains 54, 55, 56 and 57 are connected to one terminal of the color switch of sub-groups, master switch main 54 is connected to the color switch of sub-group 4, of each of the major groups, as at 70, 71 and 72. Master switch main 55 is connected to the color switch of sub-group 3, of each of the major groups, as at 74, 75 and 76. Master switch main 56 is correspondingly connected as at 77, 78 and 79 and master switch main 57 as at 80, 81 and 82. There are four master switches 54', 55', 56' and 57', one for each of the master switch mains. Each of the sub-groups of switches when closed thru the color switch and thru the master switch energize an independent relay to control a contactor, or energizes an independent coil of the contactor. Thus all and any of the switches $a$ in group 50 control the white foot lights. The switches in the same vertical alignment in group 51, independently control the red lights of the foots, and similar switches of group 52 control the blue lights of the foot lights.

The arrangements of circuits is such that there is no interference and no "sneak" circuits are established in the use of the system.

The operation of the system is substantially as follows: Assume that it is desirable to produce a "scene" in which there is required the white foot lights; red proscenium lights and blue border lights. Switch $a$ of any of the sub-groups of group 50 is closed, say sub-group 1. Switch $a$ of sub-group 1 of group 51 is closed and switch $a$ of sub-group 1 of group 52 is closed and the corresponding color switches 80, 81 and 82 are closed. The set-up is now ready. When this set-up is to be brought into service the master switch 57' is closed, which will energize the circuits of the set-up and light the lamps controlled thereby.

It will now be apparent that any other combination may be formed by closing other switches of the sub-groups 2, 3 or 4 and their color switches 70 to 79, leaving the master switch 54', 55' or 56' controlling the new combination, open until the illumination is required.

Assuming that switch $d$ of sub-group 1 in an active set-up is closed and it is desired to light the same lamps in the second inactive set-up, the same switch in another sub-group may be closed without in any way affecting the circuit controlled by the first switch.

A set-up, to be subsequently used, should be made by switches in like sub-groups, of the several groups controlled by a master switch which is at the time open. By this means there is no leak or sneak current passing from one set-up to another. A set-up to be subsequently used, however, may contain switches that control circuits already in use in a prior set up in which event, in the transition of one set-up to the other the lamps controlled thereby are not extinguished. Furthermore a plurality of set-ups may be energized at one time, or any part of one set-up may be retained in circuit with a subsequently energized set-up making many desirable combinations. A set-up to "go dark" requires only that its controlling color switch be opened. The set-up is not necessarily destroyed by extinction of the lamps which it controls as it may be preserved and used again without adjusting any of the switches except the controlling color master.

The closed switches indicate clearly the combinations established by inactive set-ups and are as readily observable as pilot lamps that may be used for the same purpose and that are the only means employed for the purpose in systems heretofore used.

It is manifest from the foregoing disclosure that a large number of non-interfering combinations or set-ups may be established, in the practice of the system, that may be subsequently energized and controlled by use of one or the other of the master switches and that in some examples more than one master switch may be used to control a set-up.

Having described my invention what I claim as new and desire to secure by Letters Patent is:—

1. An electric current control system having in combination a plurality of current supply circuits; a plurality of electromagnetic switches, one individual to each current supply circuit and each switch having a pair of windings which separately can close a given associated switch; a plurality of pairs of manual switches, the switches of each pair controlling respectively the energization and deenergization of the two windings of a given associate electro-magnetic switch and a master switch to close circuit through like closed manual switches of all of the pairs.

2. An electric current control system having in combination a plurality of current supply circuits; a plurality of electro-magnetic switches, one individual to each current supply circuit and each switch having a pair of windings which separately can close a given associate switch; a plurality of groups of manual switches; each group comprising a plurality of pairs of sub-groups, like switches of each pair of sub-groups controlling the energization and deenergization of the electromagnetic windings, respectively, and a master switch controlling each sub-group.

3. An electric current control system having in combination a plurality of current supply circuits; a plurality of electro-magnetic switches, one individual to each current supply circuit and each switch having a plurality of windings, which separately can close a given associate switch; a plurality of groups of manual switches, like switches of the group arranged in sub-groups, and controlling the energization and deenergization of the respective windings of a given electro-magnetic switch common to a given current supply circuit; a master switch controlling each sub-group and a switch controlling like sub-groups of each group.

4. An electric current control system having in combination a plurality of current supply circuits; a plurality of electro-magnetic switches, a plurality of which control the same current supply circuit, and each switch having a plurality of windings which separately can close a given associate switch; a plurality of groups of manual switches, each group divided into a plurality of sub-groups; there being as many sub-groups in a given group as there are windings for controlling a given current supply circuit; and a master switch for each sub-group.

5. An electric current control system having in combination a plurality of groups of current supply circuits; a plurality of groups of electro-magnetic switches for controlling the respective circuits, one switch individual to each current supply circuit and each switch having a plurality of windings which separately can close a given associate switch; a plurality of groups of manual switches, the switches of each group arranged in a plurality of sub-groups and like manual switches of the sub-groups, of all of the groups, controlling circuits common to a given group of circuits by closing circuit through the respective windings and a master switch for each of the sub-groups.

6. An electric current control system having in combination a plurality of groups of current supply circuits; a plurality of groups of electro-magnetic switches for controlling the respective circuits, one switch individual to each current supply circuit and each switch having a plurality of windings which separately can close a given associate switch; a plurality of groups of manual switches. the switches of each group arranged in a plurality of sub-groups, and like manual switches of the sub-groups of all of the groups controlling circuits common to a given group of circuits by closing circuit through the respective windings; a master switch for each of the sub-groups and another master switch for each sub-group controlling, respectively the master switches of like sub-groups of each of the groups.

7. An electric current contol system having in combination a plurality of current supply circuits; a plurality of electro-magnetic switches a plurality of which control the same current supply circuit; a plurality of groups of manual switches divided into sub-groups; like switches of each sub-group of all of the groups controlling the respective current supply circuit by energizing respective electro-magnetic switches and a master switch for each sub-group of manual switches.

In testimony whereof I hereunto subscribed my name.

ALBERT R. LOCKE.